United States Patent [19]
Hartmann et al.

[11] Patent Number: 5,208,689
[45] Date of Patent: May 4, 1993

[54] ELECTRO-OPTIC DISPLAY DEVICE WITH INCREASED NUMBER OF TRANSMISSION LEVELS

[75] Inventors: Wilbert J. A. M. Hartmann; Leonard J. M. Esser; Antonius G. H. Verhulst; Johannes A. M. M. Van Haaren, all of Eindhoven, Netherlands

[73] Assignee: U.S. Philips Corporation, New York, N.Y.

[21] Appl. No.: 747,218

[22] Filed: Aug. 19, 1991

[30] Foreign Application Priority Data
Sep. 13, 1990 [NL] Netherlands ............... 9002011

[51] Int. Cl.[5] .................................. G02F 1/13
[52] U.S. Cl. ................................. 359/54; 359/79; 340/793
[58] Field of Search ............... 359/54, 56, 87, 89; 340/793

[56] References Cited
U.S. PATENT DOCUMENTS 5,056,893 10/1991 Holz et al. ..................... 359/54
5,157,524 10/1992 Dijon et al. ................... 359/54

FOREIGN PATENT DOCUMENTS 0316774 5/1989 European Pat. Off. .
0361981 4/1990 European Pat. Off. ........ 359/87

Primary Examiner—William L. Sikes
Assistant Examiner—Huy K. Mai
Attorney, Agent, or Firm—Bernard Franzblau

[57] ABSTRACT

An LCD device in which the pixels are divided into sub-pixels composed of one analog adjustable sub-pixel and a plurality of digitally controlled other sub-pixels. By combining a discrete adjustment of the (sub)-transmission levels of the other sub-pixels with an analog adjustment of transmission levels of the one sub-pixel, the total number of light transmission levels is increased considerably. The analog adjustment thus is less critical because the greater part of the ultimate level is defined by the accurate discrete adjustment.

22 Claims, 2 Drawing Sheets

ELECTRO-OPTIC DISPLAY DEVICE WITH INCREASED NUMBER OF TRANSMISSION LEVELS

BACKGROUND OF THE INVENTION

This invention relates to a display device comprising an electro-optical medium positioned two supporting plates in which pixels divided into a plurality of sub-pixels are defined on at least one of the supporting plates by means of picture electrodes.

Display devices of the type described may be used for displaying alpha-numerical information or video images.

A device of the type mentioned in the opening paragraph is described in EP-A 0,316,774. The device shown in this Patent Application is driven in the so-called multiplex mode in which, in a system of perpendicularly crossing selection rows or address rows (row electrodes) and data rows (column electrodes), the drive is effected by alternately energizing the address rows while the information to be written is presented to the data rows. Different transmission levels (grey scales) can be introduced in such a device by dividing the column electrodes into sub-electrodes (for example, in accordance with surface ratios of 4 : 2 : 1).

To be able to introduce a large number of grey scales (for example, more than 50) the number of sub-electrodes for each column increases considerably (5 or more). Although this problem can be obviated to some extent by dividing the row electrodes also into sub-electrodes, as is suggested in EP-A 0,316,774, this leads to other problems such as, for example, a poorer efficiency in the number of grey scales to be realised because one grey scale can be defined in several ways.

Another possibility of adjusting grey scales is the use of the transmission/voltage characteristic curve, notably if it has a gradual slope such as, for example, in display devices based on the twisted nematic liquid crystal effect. However, an accurately identical adjustment, viewed across the entire display device, is a problem due to local variations in, for example, threshold voltages and voltage variations caused by parasitic resistances and capacitances.

A mixed alternative is described in EP-A 0,361,981 in which, for example, each sub-pixel has 4 sub-levels of transmission, for example, 0, $\frac{1}{3}I_0$, $\frac{2}{3}I_0$ and $I_0$. However, also in this case there are problems when defining grey scales, dependent on the adjustability of each sub-pixel.

Another drawback is that for a specific number of grey scales the width of the narrowest sub-electrode with respect to that of the widest sub-electrode becomes very small. For 256 grey scales the width of the narrowest sub-electrode is then approximately 1/17 of the whole. This causes problems of a lithographic nature.

SUMMARY OF THE INVENTION

It is one of the objects of the invention to provide a display device in which these problems are largely prevented.

It is a further object of the invention to provide a display device in which the grey scales can be realised with simple electronic components.

To this end a display device according to the invention is characterized in that one sub-pixel has a surface area which is at most equal to that of one of the other sub-pixels and is adjustable at a plurality of transmission levels, while the other sub-pixels are exclusively switchable between two extreme transmission states.

The invention is based on the recognition that an accurate first adjustment (coarse adjustment) of the grey scale is possible by having it defined by the sub-pixels having two transmission states, with a second adjustment (fine adjustment) superposed thereon via the one sub-pixel having a plurality of transmission levels.

For the first adjustment a division can be used in, for example passive display devices as described in U.S. patent application Ser. No. 729,529, (4/15/91) whose contents are herein incorporated by reference, but active drive is alternatively possible.

The surface areas of the other sub-pixels are preferably in a ratio of $2^n:2^{n-1}:\ldots:2:1$.

When the one sub-pixel has the same surface area as the smallest of the other sub-pixels, some grey scales can, however, be adjusted in two different ways.

To prevent this, a preferred embodiment of a display device according to the invention is characterized in that the adjustable sub-pixel has m transmission levels and a surface area which is substantially $(1-1/m)$ times the surface area of the smallest of the other sub-pixels.

Since the other sub-pixels have only two extreme states, a display device in which the pixels are arranged in a matrix configuration can be driven in a simple way by switching elements which drive these sub-pixels in a binary manner and drive the adjustable sub-pixel in an analog manner or with a plurality of discretely adjustable levels.

Binary switching behaviour occurs of itself in surface-stabilized ferro-electric liquid crystal display devices. The one sub-pixel having adjustable transmission levels can then be obtained by subjecting the ferro-electric crystal locally (at the location of the one sub-pixel) to one of the treatments as described in U.S. Pat. No. 5,151,804 (9/29/92) in the name of the applicant or, for example, by means of thickness Variations in the sub-pixel. If necessary, the smallest sub-pixel may also be driven via an active switching element, as described in U.S. Pat. No. 4,840,462 in the name of the applicant.

It is of course also possible to drive a liquid crystal (or other electro-optical medium) having a gradual transmission/voltage characteristic by means of binary switching elements, with the surface pixels being defined in a similar way as described above, while the smallest sub-pixel is driven in an analog manner, if necessary (possibly via a D/A converter).

These and other aspects of the invention will now be described in greater detail with reference to some embodiments shown in the accompanying drawings.

DESCRIPTION OF THE PREFERRED EMBODIMENTS

Figure 1:
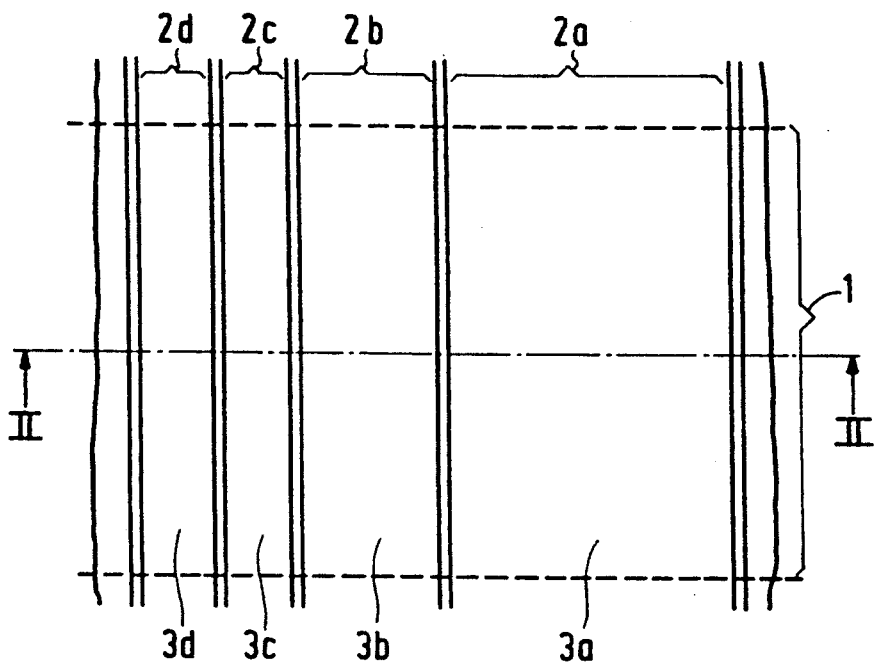
FIG. 1 is a diagrammatic plan view of a display cell according to the invention.

FIG. 1 shows diagrammatically a division of electrodes 1, 2 between which an electro-optical material is present. In this embodiment the electrodes, for example, a row electrode 1 and a column electrode 2 are divided into sub-electrodes $2^a$, $2^b$, $2^c$, $2^d$ whose widths are in a ratio of 4:2:1:1. At the area of the crossings of the electrodes 2 (electrode strips) ($2^a$, $2^b$, $2^c$, $2^d$) and 1 a display cell 3 is defined which can entirely or partly change its electro-optical properties by suitably driving the sub-electrodes.

If a liquid crystal is used as an electro-optical medium, it is possible to apply such a voltage to the (sub-)electrodes that a given voltage threshold is exceeded and the transmission state changes (locally), for example, from light absorbing to light transmissive, or conversely. This behaviour can also be determined in combination with the position of possibly present polarizers.

Since the electrode 2 is divided into sub-electrodes, it is possible to drive only a portion of the display cell 3. When the electrode 1 and sub-electrode $2^a$ are correctly energized, the portion $3^a$ of the display cell is driven so that this portion becomes, for example, light transmissive, whereas the other portion of the display cell remains opaque to light. When the electrode 1 and sub-electrode $2^b$ are energized, the portion $3^b$ is driven, etc. In this way different surface areas of the display cell 3 can be driven so that different ratios of light transmissive/light opaque (white/black), in other words different grey scales, are obtained.

Figure 2:
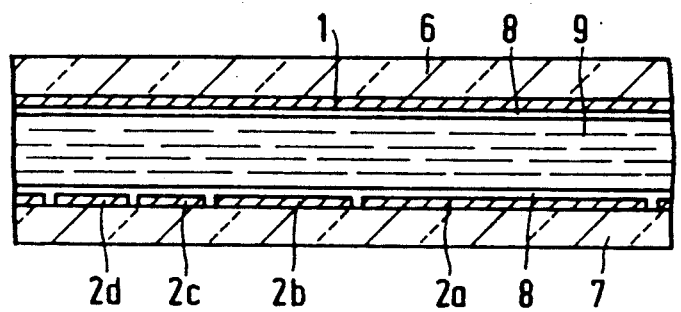
FIG. 2 is a diagrammatic cross-section taken on the line II—II in FIG. 1.

FIG. 2 is a diagrammatic cross-section of a part of the device taken on the line II—II in FIG. 1.

The electrodes 1 and 2 are arranged as parallel strips of transmissive conductive material (for example, indium tin oxide) on transparent substrates 6, 7 of, for example, glass or quartz. As described above, the electrodes 1 and 2 are subdivided into column-sub electrodes $2^a$, $2^b$, $2^c$, $2^d$, while the row electrodes are also subdivided, if necessary. To give the liquid crystal molecules a given direction of preference at the area of the electrodes, the electrodes are coated with an electrically insulating or orienting layer 8. A layer of liquid crystal material 9, in this case a ferro-electric liquid crystal material is present between the two substrates 6, 7. The device can be used as a display device and will therefore be provided in a conventional manner with polarizers, colour filters and/or mirrors, as well as with an illumination system.

The ferro-electric liquid crystal material has a bistable switching behaviour at the area of the sub-electrodes $2^a$, $2^b$, $2^c$, so that the portions $3^a$, $3^b$, $3^c$ are exclusively switchable between two extreme states, namely substantially entirely transmissive and substantially entirely opaque (binary switching behaviour).

According to the invention the portion $3^d$, whose surface area is equal to the portion $3^c$, is adjustable at for example, four levels. This can be achieved by giving the display cell 3 at the area of the portion $3^d$, a gradual transmission/voltage characteristic with the aid of varying alternating voltages applied between the electrodes 1 and $2^d$, as described in greater detail in U.S. Pat. No. 5,151,808.

If the values of 0, $\frac{1}{3}$I, $\frac{2}{3}$I and I are chosen as the adjustable levels for the quantity of transmitted light per surface area and if the value a is assigned to the surface area of the portion $3^d$, the transmission for this portion $3^d$ is 0, $\frac{1}{3}$aI, $\frac{2}{3}$aI or aI. If the other portions $3^a$, $3^b$, $3^c$ of the display cell $3^d$ have surface areas of 4a, 2a and a, respectively, it is possible to adjust 8 transmission levels, namely 0, aI, 2aI, ... 7aI.

The four values which are adjustable via the portion $3^d$ can then be superposed on these binary adjustable values so that a total of 32 transmission levels from 0 to 8aI is possible. This number is even higher for a larger number of adjustable levels. More generally, the number of grey scales is multiplied by a factor m by adding a single sub-pixel which can be adjusted at m different values. More generally, use of the invention leads to a total of $2^{n-1} \cdot m$ grey scales for the smallest sub-pixel with n sub-pixels and m different transmission values. Moreover, the grey scales are sharply defined in so far as they are exclusively determined by the binary adjustable values.

Viewed across an entire display device, a small shift of the transmission/voltage characteristic (for example, due to thickness variations) has hardly any influence on the grey scales because the coarse adjustment is not affected thereby, which is in contrast to the device described in EP-A 0,361,981 in which such a coarse adjustment in conjunction with a fine adjustment is not used.

Nevertheless, the device of FIGS. 1, 2 still has some shortcomings because full drive of the portion $3^d$ of the display cell 3 leads to the same transmission level as driving the portion $3^c$ in the one extreme level. As a result, the display device of FIGS. 1 and 2 has less than 32 individual transmission levels for the example described, i.e., n=4 and m=4. To prevent this, the display cell 13 in the device of FIG. 3 has sub-cells $13^a$, $13^b$, $13^c$, $13^d$, $13^e$, $13^f$ whose surface areas are in the ratio of 16:8:4:2:1: (1−1/m) in which m is the number of transmission levels at which the portion $13^f$ of the display cell is adjustable. To obtain such a division, the portions of one display cell are now defined by row electrodes 11 and column electrodes 13 which are both divided into sub-electrodes ($11^a$, $11^b$, and $12^a$, $12^b$, $12^c$, respectively). The binary switchable portions $13^a$, $13^b$, $13^c$ are defined at the area of the row electrode $11^a$ and the column electrodes $12a$, $12b$, $12c$, having a mutual width ratio of 4:2:1 at this area. The portions $13^d$, $13^e$ are defined at the area of the row electrode $11^b$ having a mutual column width ratio of 2:1. By a suitable choice of the width ratio of the row electrodes $11^a$, $11^b$ (namely 8:1.107) a device is obtained which, with respect to the binary adjustable portions $13^a$, $13^b$, $13^c$, $13^d$, $13^e$, has the same advantages as described in said U.S. patent application Ser. No. 29,529 while a fine adjustment of the transmission levels is superposed thereon by means of the portion $13^f$.

In the relevant example, m=8 and the width ratio of the column electrodes at the area of the row electrode $11^a$ is 7:8:16. In the case of full drive the transmitted (or blocked) quantity of light of the portion $13^f$ is thus $\frac{7}{8}$ that of the light in the case of full drive of the portion $13^e$, so that the above-mentioned possibility of driving one and the same grey scale in two ways no longer exists. The device shown has $2^5=32$ coarse adjustments at the area of the binary adjustable portions $13^a$, $13^b$, $13^c$, $13^d$, $13^e$. Thus, there is a total number of 256 grey scales in the display device due to the adjustment at 8 intermediate levels at the area of the portion $13^f$. As is apparent from the foregoing, the row electrode $11^b$ has a width which is approximately $\frac{1}{8}$ of that of the total row width, which is advantageous from a lithographic point of view.

In the same way as described in the U.S. patent application Ser. No. 729,529 the smallest sub-pixel can be situated in such a way that the optical point of gravity is in the centre of the pixel. The smallest sub-pixel is then surrounded by (parts of) the pixel which is the largest but one, and so forth. The other sub-pixels symmetrically surround the smallest sub-pixel.

Figure 3:
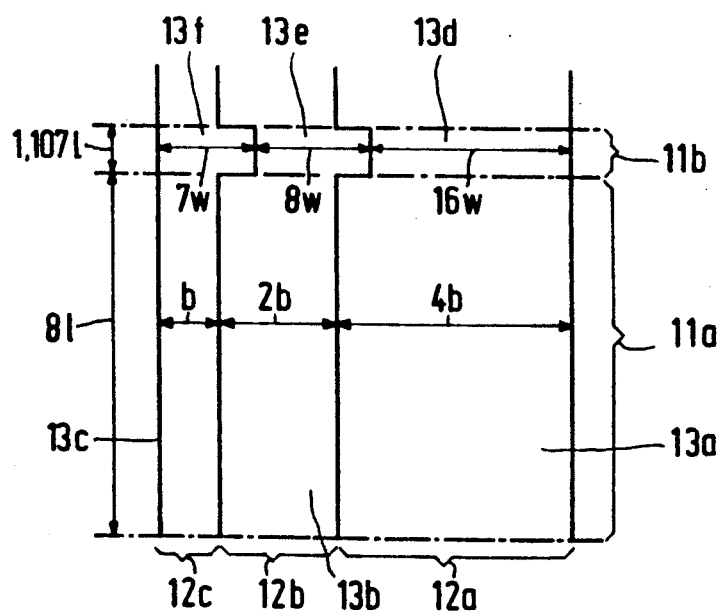
FIG. 3 is a diagrammatic plan view of a further display cell according to the invention.
Figure 4:
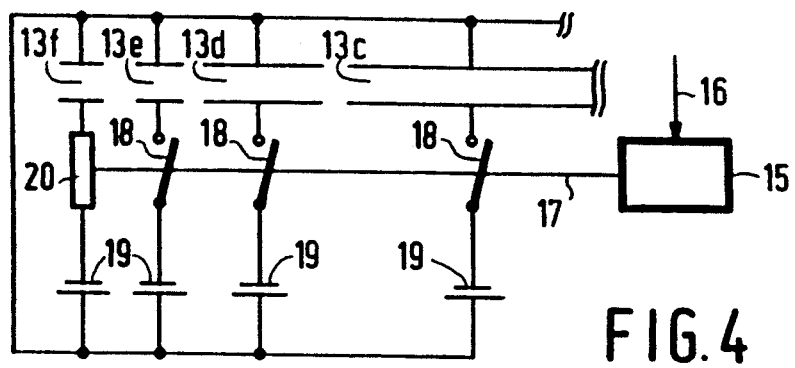
FIG. 4 shows diagrammatically the way in which such a display cell is driven.

FIG. 4 shows diagrammatically an equivalent circuit diagram of the device of FIG. 3. An input circuit 15 converts an incoming signal 16 representing the information to be displayed into a plurality of drive signals 17. The drive signals 17 drive a plurality of switches 18 applying such a voltage to the portions $13^a$, $13^b$, $13^c$, $13^d$, $13^e$ that there is binary switching between such voltages (supplied by voltage sources 19 shown diagrammatically) that they switch between a fully transmissive state and a fully non-transmissive state. The drive signals 17 also control an adjustable resistor 20 which adjusts the portion $13^f$ of the pixel at one of the levels to be displayed, dependent on the signals presented. Instead of a variable resistor it is also possible to use, for example, a D/A converter. The drive signals then consist of, for example, an 8-bit signal whose 5 most significant bits determine the adjustments of the switches 18 and the 3 least significant bits determine the adjustment of the D/A converter.

Although a ferro-electric medium has been described hereinbefore which itself switches in a binary manner so that the switches 18 are actually not required, it will be evident that grey scales can also be displayed by means of these switches in a non-binary switching media in the manner described, provided that the switches switch between two voltage values which are outside the transition in the transmission/voltage characteristic. In this way the invention is thus also applicable to, for example, twisted nematic liquid crystal devices.

Figure 5:
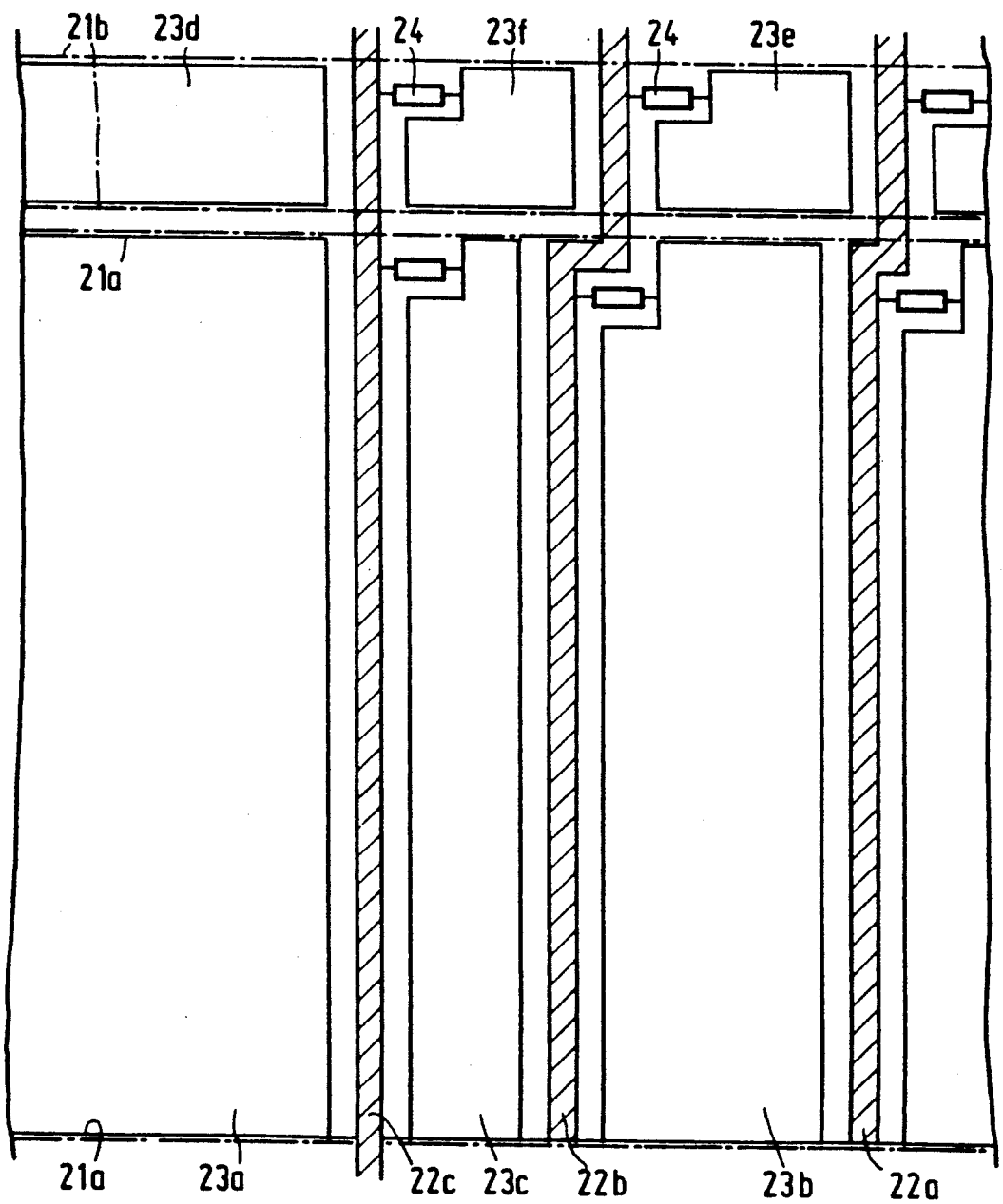
FIG. 5 shows diagrammatically a part of a display cell according to the invention for active drive.

The invention is neither necessarily limited to the above-mentioned passive drive. For example, FIG. 5 shows sub-electrodes $23^a$, $23^b$, $23^c$, $23^d$, $23^e$, $23^f$ of an actively driven display device complying with the desired surface ratios as described above and being connected via switching elements 24, not further referred to, to column electrodes $22^a$, $22^b$, $22^c$. The sub-electrodes 23, switching elements 24 and column electrodes 22 are present on a first substrate. The row electrodes $21^a$, $21^b$ are on a second substrate in this example, which together with the first substrate and a sealing edge defines a space filled with liquid crystal material. If necessary, the device is provided in the conventional manner with colour filters, polarizers, etc. At the area of the sub-electrode $23^f$ the display device has a gradual transmission/voltage characteristic which is adjustable at several values, while it is adjustable between two extreme values at the area of the other sub-electrodes. This is achieved by making use of, for example, a ferro-electric liquid crystalline medium which is subjected to an alternating voltage treatment at the area of sub-electrode $23^f$. Use can be made again of twisted nematic liquid crystalline materials which are exlusively used between two extreme states at the area of the sub-electrodes $23^a$, $23^b$, $23^c$, $23^d$, $23^e$.

Instead of the two-poles shown, it is alternatively possible to use three-poles for the switches 24. The row electrodes 11 are then provided on one and the same substrate, for example, as narrow metal tracks crossing the column electrodes, while the other substrate is provided with one single counter-electrode.

We claim:

1. A display device comprising: an electro-optical medium positioned between two supporting plates in which pixels are divided into a plurality of sub-pixels that are defined on at least one of the supporting plates by means of picture electrodes, characterized in that for a pixel one sub-pixel thereof has a surface area which is at most equal to a surface area of one of the other sub-pixels of said same pixel and is adjustable at a plurality of transmission levels greater than two, while the other sub-pixels of said pixel are exclusively switchable between two extreme transmission states.

2. A display device as claimed in claim 1, wherein said other sub-pixels have a mutual surface ratio of $2^n : 2^{n-1} : \ldots : 2 : 1$.

3. A display device as claimed in claim 1, wherein the adjustable sub-pixel has m transmission levels and a surface area which is substantially $(1 - 1m)$ times the surface area of the one of the other sub-pixels.

4. A display device as claimed in claim 1 wherein the pixels are arranged in a matrix configuration and a plurality of selection rows and data rows defined the information of the sub-pixels via switching devices which drive said other sub-pixels in a binary manner and wherein the adjustable sub-pixel is driven in an analog manner or with a plurality of discretely adjustable levels.

5. A display device as claimed in claim 1 wherein the intermediate transmission states of the pixels extreme transmission states are adjustable via switching elements.

6. A display device as claimed in claim 1, wherein the electro-optical medium comprises a ferro-electric liquid crystalline medium.

7. A display device as claimed in claim 1 wherein the adjustable sub-pixel is entirely or partly surrounded by the other sub-pixels.

8. A display device as claimed in claim 7, wherein each sub-pixel except the largest sub-pixel is at least partly surrounded by a larger sub-pixel.

9. A display device as claimed in claim 2, wherein the adjustable sub-pixel has m transmission levels and a surface area which is substantially $(1 - 1/m)$ times the surface area of the smallest one of the other sub-pixels.

10. A display device as claimed in claim 2, wherein the pixels are arranged in a matrix configuration and, a plurality of selection rows and data rows define the information of the sub-pixels via switching devices which drive said other sub-pixels in a binary manner and wherein the adjustable sub-pixel is driven in an analog manner or with a plurality of discretely adjustable levels.

11. A display device as claimed in claim 3, wherein the pixels are arranged in a matrix configuration and a plurality of selection rows and data rows define the information of the sub-pixels via switching devices which drive said other sub-pixels in a binary manner and drive the adjustable sub-pixel via an analog voltage or with a plurality of discretely adjustable voltage levels.

12. A display device as claimed in claim 3, wherein the intermediate transmission states and the extreme transmission states are adjustable via switching elements.

13. A display device as claimed in claim 3, wherein the adjustable sub-pixel is entirely or partly surrounded by the other sub-pixels.

14. A display device as claimed in claim 4, wherein the adjustable sub-pixels is entirely or partly surrounded by the other sub-pixels.

15. A gray-scale display device comprising:
first and second support plates with an electro-optical material located therebetween,
a first and second plurality of picture electrodes arranged on said first and second support plates, respectively, so as to define a plurality of pixels, said picture electrodes being further arranged so as to divide the pixels into respective pluralities of sub-pixels wherein each pixel includes one given sub-pixel having a surface area which is at most equal to the surface area of one other of its sub-pixels, said one given sub-pixel having a light transmission characteristic which is varied over a plurality of light transmission levels greater than two, and
means for selectively applying binary type switching voltages to the other sub-pixels such that the other sub-pixels are only switchable between two extreme light transmission states.

16. A display device as claimed in claim 15, wherein the other sub-pixels of a pixel have different surface areas arranged in a binary-exponential ratio, and
means for selectively driving said one given sub-pixel with an analog voltage that can be varied to produce said plurality of light transmission levels of the one given sub-pixel.

17. A display device as claimed in claim 15, wherein the other sub-pixels of a pixel have different surface areas and said one given sub-pixel has a surface area equal to the surface area of the smallest one of the other sub-pixels of its respective pixel.

18. A display device as claimed in claim 15, wherein said one given sub-pixel has a surface area a and first, second and third other sub-pixels have surface areas of a, 2a and 4a, respectively.

19. A display device as claimed in claim 15, wherein said one given sub-pixel has m light transmission levels, where m is an integer greater than two, and has a surface area equal to $(1-1m)$ times the surface area of the smallest one of the other sub-pixels of its respective pixel.

20. A display device as claimed in claim 15, wherein said first and second plurality of picture electrodes are arranged in a matrix in which the picture electrodes of the first plurality of picture electrodes are divided into sub-electrodes of different widths thereby to define different surface areas for the sub-pixels of a pixel.

21. A display device as claim in claim 20, wherein the electrodes of the second plurality of picture electrodes are divided into sub-electrodes of different widths.

22. A display device as claimed in claim 15, wherein the other sub-pixels of a pixel have different surface areas, and
means for selectively driving said one given sub-pixel with a voltage that can be varied between a plurality of discrete voltage levels greater than two.

* * * * *

UNITED STATES PATENT AND TRADEMARK OFFICE
CERTIFICATE OF CORRECTION

PATENT NO. : 5,208,689
DATED : May 4, 1993
INVENTOR(S) : Wilbert H. A. M. Hartmann et al It is certified that error appears in the above-indentified patent and that said Letters Patent is hereby corrected as shown below:

```
Column 1, line  8, after "positioned" insert --between--;
Column 3, line 64, change "5,151,808" to --5,151,804--;
Column 4, line 51, change "29,529" to --729,529,--.

Claim  3, column 6, line 17, change "(1-1m)" to
                             --(1-1/m)--;
                    line 18, before "one" insert
                             --smallest--;
Claim  4, column 6, line 21, change "defined" to --define--.
Claim  5, column 6, line 28, change "of the pixels" to
                             --and--;
                    line 29, after "states" insert --of the
                             pixels--.
Claim 10, column 6, line 46, after "and" delete ",".
Claim 14, column 7, line  2, change "sub-pixels" to
                             --sub-pixel--.
Claim 19, column 8, line 11, change "(1-1/m)" to
                             --(1-1/m)--.
```

Signed and Sealed this

Twenty-ninth Day of March, 1994

Attest:

BRUCE LEHMAN

*Attesting Officer*    *Commissioner of Patents and Trademarks*